Oct. 29, 1935. P. W. CRANE ET AL 2,019,119

EXTRUSION APPARATUS

Filed April 26, 1934

INVENTORS
Paul W. Crane
Reuben T. Fields
BY

ATTORNEY

Patented Oct. 29, 1935

2,019,119

UNITED STATES PATENT OFFICE 2,019,119

EXTRUSION APPARATUS

Paul W. Crane, Montclair, and Reuben T. Fields, Arlington, N. J., assignors to Dupont Viscoloid Company, Wilmington, Del., a corporation of Delaware Application April 26, 1934, Serial No. 722,596
In Great Britain September 10, 1931

4 Claims. (Cl. 18—15)

This invention relates to an extrusion apparatus and, more particularly, to an apparatus for extruding a continuous web of cellulose derivative plastic or similar plastic. This application is a continuation in part of applicants' copending application Serial No. 485,456, filed September 30, 1930, for Method of producing plastic sheeting and apparatus therefor. Whereas said application Serial No. 485,456 claims a process of producing a continuous web of plastic, the present application is directed to the apparatus for extruding a continuous web of plastic.

Heretofore extrusion apparatus has been widely used for making rods, ribbons, and tubes of cellulose derivative plastic, or the like. In the manufacture of these articles a plastic of extremely high consistency is used so that great pressures of 3000-12000 pounds per square inch have been necessary to produce rates of extrusion of 2-12 inches per minute. The use of such high pressures required in the apparatus an extrusion orifice of particularly rugged construction. In the design of these orifices the flow of plastic was gradually constricted by surfaces converging to the point where the rod, ribbon, or tube was actually formed. This point is usually followed by a relatively long and narrow calendering straightway. In such a design the friction between the plastic and the surfaces of the die is enormous but this was found to be not detrimental in the case of an annular orifice, such as that used for making tubing. In the case of a flat sheet, or continuous web, of material, however, the friction at the edges of the orifice tends to restrict the flow at this point, which results in very poor edges on the sheet. Furthermore, in using orifices of this type there is so much frictional resistance that it is impossible to obtain high extrusion speeds without bad rippling of the surface and non-uniform caliper.

Heretofore sheets of imitation mother-of-pearl have been made by extruding a cellulose derivative plastic containing pearl essence or similar flat particles. In the manufacture of these sheets the principle of constriction by means of converging surfaces is employed in the orifice for the purpose of obtaining maximum orientation of the particles. Although in the manufacture of imitation mother-of-pearl sheets this type of orifice is used with material of very much lower consistency than that used for making rods and tubes, nevertheless it is not possible to obtain extrusion speeds greater than 2-3 feet per minute without rippling or at least without producing a poor surface.

In the manufacture of continuous webs of cellulose derivative plastic of a finished thickness such as 0.003-0.035 inch, prior methods have generally comprised the manufacture of a block of the plastic which is sheeted by a sheeter knife or by the casting process, in which a dope is flowed on to a casting surface and solvents evaporated as in the making of photographic film. The manufacture of such sheeting, which is used in large volume as the interlayer in safety glass, has not, prior to applicants' invention, involved the use of an extrusion process with any degree of success. Prominent among the reasons for the lack of this success was the inability to extrude the sheets at a sufficient rate to be commercially practical without getting sheets of very poor quality, i. e., non-uniform caliper and rippled surface effects.

An object of the present invention is to provide a simple and economical apparatus whereby a continuous web of cellulose derivative plastic or similar plastic may be extruded at a commercial rate without having the defects and flaws inherent in such webs when extruded at a commercial rate from the heretofore known extrusion apparatuses. A further object is to provide an extrusion apparatus adapted for carrying out the process described in applicants' copending application Serial No. 485,456. Other objects of the invention will be apparent from the description given hereinafter.

The above objects are accomplished according to the present invention by constructing an apparatus for extruding a continuous web, thin sheet, thin walled tube, or the like, of cellulose derivative plastic or similar plastic, which apparatus comprises a container for the plastic, said container being provided with an aperture through which the plastic is extruded, usually means for heating the plastic in the container, and means for exerting a uniform pressure on the mass of plastic in the container adjacent said aperture, said aperture at the portion of minimum caliper being defined by a pair of opposed, substantially parallel edges, and said aperture being so designed that the path of travel of the plastic through the portion of the aperture of minimum caliper shall not exceed ¼ of an inch in length and said aperture being further so designed as to give the plastic mass such an unrestricted flow up to the initial point of minimum caliper of the aperture that the pressure on the plastic mass is not appreciably decreased until the mass reaches said initial point of minimum caliper and the pressure on the mass immediately preceding said initial point of minimum caliper is substantially uniform along the line parallel to said pair of opposed edges.

In a preferred form of the present invention, specifically adapted for extruding a continuous web or sheet, a more or less slit-like aperture is provided in the container and on the outside wall are mounted in opposed relation two blades substantially straight and parallel, one being preferably movably mounted so that the distance between the blades can be adjusted. These blades define the minimum caliper portion of the passage through which the plastic is extruded and the functioning edges of the blades are approximately 1/16" in width so that the path of travel of the plastic through the minimum caliper portion of the passage is likewise approximately 1/16". Both the aperture and the blades are so designed that the pressure on the plastic in that portion of the container near the aperture and right up to the functioning edges of the blades is uniform, the pressure, of course, decreasing and the rate of travel of the plastic increasing at the minimum caliper portion of the passage. The basic principle in the construction of the apparatus according to the present invention is to eliminate the long, narrow approach to the aperture heretofore employed and considered necessary and to have not more than 1/4" blade width, preferably about 1/16" blade width, to shape the plastic body being extruded.

Referring to the drawing forming a part of the present application:

Figure 1:
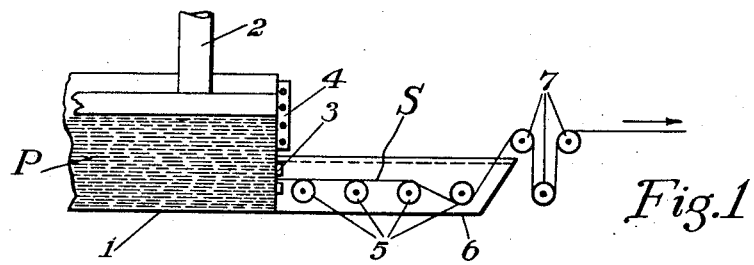
Fig. 1 is a diagrammatic, elevational view of an apparatus according to the present invention, parts being broken away.

Referring particularly to Fig. 1, P indicates plastic material in the container 1, provided with a plunger 2, actuated in any desired manner, and heating coil 4. The container 1 is also provided with an aperture 3 which is shown in greater detail in Figs. 2 to 5 and described later. The plastic P in the container 1, heated to the desired temperature by the heating coils 4, is extruded through aperture 3 by bringing down the plunger 2, the plastic being extruded in web form as indicated by S. The web is run over guide rolls 5 in the container 6, through a tensioning roll 7 and from there to hardening baths, cutting machines, to be seasoned, or as otherwise desired, the particular steps of processing such material not being a part of the present invention.

Figures 2, 3, 4:
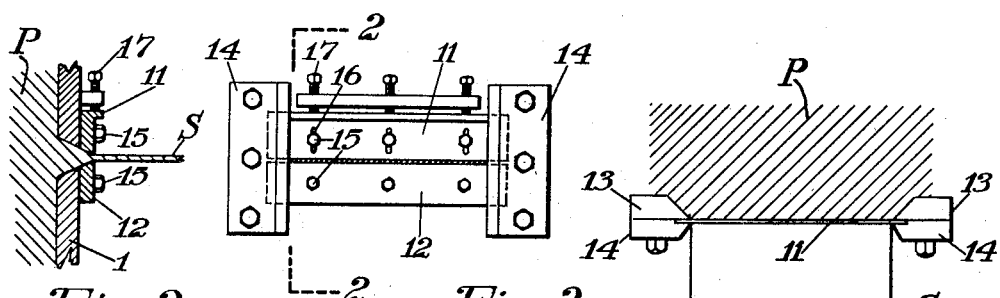
Fig. 2 is a section through the plastic and aperture substantially on the line 2—2 of Fig. 3.
Fig. 3 is a front view of the aperture and related parts of an extrusion apparatus according to the present invention.
Fig. 4 is a plan view of the aperture with the plastic sheet emerging therethrough, the plastic in the container behind the aperture being shown in section.
Figure 5:
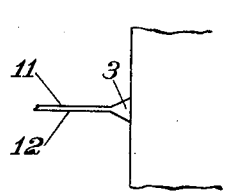
Fig. 5 is a diagrammatic view illustrating how the ends of the aperture may be increased in caliper compared to the major portion of the aperture to give the plastic web or sheet increased thickness along its side edges to increase the strength thereof if the sheet is drawn away from the aperture under tension.

In Figs. 2, 3, and 4 are shown in detail an aperture constructed according to the principles of this invention. This aperture conveniently comprises a mated pair of metal blades as 11, 12 which are clamped against supports 13—13 by clamps 14—14 and are also held by bolts 15. If desired and as shown, one blade, as 11, may be made adjustable with respect to the other by slit 16 for the bolts 15 and adjusting screws 17. As shown more particularly in Fig. 2, the edges of the container 1 are contoured all across their width to form a wide approach to the edges of the blades 11, 12. While a structure providing for the adjustability of the orifice is preferable, it will be obvious that a non-adjustable orifice may be used, if desired, in which case the blades 11, 12 may be (preferably removably) fixed to the container, or the container opening alone may serve as an orifice.

Figure 6:
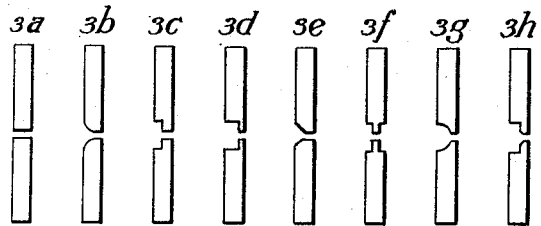
Fig. 6 is a series of somewhat diagrammatic sections taken through various apertures which may be used in the practice of the invention, the sections being comparable to a section taken on a line such as 2—2 in Fig. 3 but cross hatching being omitted for simplicity.

In Fig. 6 are illustrated various detailed apertures 3a to 3h which are desirable for use in extruding a continuous web. These apertures are designed for plastic to be extruded from left to right looking at the figure.

Although the apparatus in Fig. 1 shows a container 6 intended to contain a hardening bath, the present invention is directed to the plastic container 1, the aperture used therein, and means for applying pressure to the plastic in that container, and not with any specific process of treating the extruded plastic in hardening baths, seasoning vaults, and the like. The plastic may be extruded into the air rather than into a hardening bath.

In this type of extrusion the plastic P, usually heated in the container 1, is of such composition that it is in the form of at least a semi-self-sustaining body as it is extruded. The web is carried off over the guide rolls 6 and generally kept under some tension by the driven rolls 7. The web may be passed through any treating baths desired, cut to appropriate lengths and seasoned before being laminated in safety glass or used in other manner.

The particular plastic composition employed in this apparatus may be varied widely as those skilled in the art will appreciate. In practice the consistency of the composition must be somewhat limited although it may be varied widely depending upon, inter alia, the temperature of extrusion, caliper of sheet being extruded, and speed of extrusion. The consistency may vary between that of a dough made by mixing together (by weight) pyroxylin of 800 centipoises (measured at 25° C. in a solution of 6% pyroxylin, 28.2% camphor and 65.7% of 95% ethyl alcohol by the falling sphere method, J. Ind., Eng. Chem. vol. 14, p. 1164) 24%; camphor 8%, 95% ethyl alcohol 68%, as a low limit of consistency, and the consistency of a dough made by mixing together (by weight) pyroxylin of 800 centipoises (measured as above) 46%; camphor 16%, 95% ethyl alcohol 38% as a high limit of consistency. It will be understood that these consistencies are standards for plastics in general, and not confined to use in determining the comparative consistency of only pyroxylin plastic. These consistency limits are those of the given plastic compositions at 52° C. The apparatus is well adapted for the extrusion of all varieties of cellulosic derivative plastics such as cellulose nitrate, cellulose acetate, cellulose ethers such as ethyl cellulose, benzyl cellulose, as well as other plastics.

The pressure may vary between 30–400 pounds per square inch and may be applied by any suitable means. It is to be noted that, although the pressure has to be uniform in the vicinity of the aperture of the container, it is immaterial whether or not it is uniform elsewhere in the container.

As to speed of extrusion or rate of flow of plastic through the aperture in the container, the practical lower limit is the speed at which the process can successfully produce sheeting at the same cost as the block process or the film casting process. The lower limit in comparison with the block process is approximately 4 feet per minute for thicknesses 0.010 to 0.025". In comparison with the film casting process, the rate is somewhat higher. The upper limit is the highest speed of extrusion which may be employed and still give an extruded body of satisfactory properties. With the apparatus herein described a rate of 6–9 feet per minute can easily be attained over long periods in commercial production and, on a smaller scale, speeds as high as 50 feet per minute have been obtained while extruding a web of uniform caliper and excellent properties.

In Fig. 6 of the drawing have been shown a variety of designs for the orifice. In commercial use the edges of the orifice for extruding continuous webs are from 0.004" to 0.050" apart. Ordinarily the trade requires sheets of a caliper coming within this limit. The usual practice is to employ a stiffer plastic (less solvent) for extruding sheets of greater caliper, in order to reduce the treating period, and a plastic at the lower limit of the consistencies given above for extruding the thinnest sheets, inasmuch as they may be treated in a short period at any rate and by using a high solvent content plastic the extrusion speed may be increased.

It is preferred to employ removable and adjustable blades to define the minimum caliper portion of the passage through which the plastic is extruded and, whether the wall of the container or blades are employed to define the extrusion passage, the principles of the present invention are equally applicable. In sharp contrast to the gradually converging approaches in the extrusion passages of apparatuses known in the prior art, the present apparatus is designed so that the plastic can flow freely up to the functioning edges of the extrusion slit and these edges are extremely narrow, not in excess of ¼" in width. Theoretically, a perfect knife edge would be the optimum functioning edge but, due to the pressure employed, such an edge is not strong enough to be practical. However, straight and parallel blades accurately ground and polished to a functioning edge of 1/16" are sufficiently strong to withstand the pressure and are preferred. Where the functioning edge of the blade exceeds ¼" in width, the inherent difficulties of the prior art long approach apertures commence and multiply with unexpected rapidity. To practice the present invention and derive the benefit thereof, the aperture must be designed to allow free flow of the plastic up to the point of minimum caliper of the extrusion passage and the portion of minimum caliper must not exceed ¼" in length. Orifice 3a in Fig. 6 represents the maximum width of ¼" of the functioning edge of the blade with the other orifices ranging from ⅛" down to a theoretical knife edge. By reference to Fig. 2, it will be seen that the wall of the container is provided with such a wide orifice that it creates substantially no friction on the plastic passing therethrough (by comparison with the friction on the plastic in passing through the minimum caliper portion of the slit defined by blades 11 and 12). As a result, the plastic flows freely and evenly right up to the point of minimum caliper of the passage with the pressure on the plastic substantially uniform all along the line parallel to the slit right up to the point of minimum caliper. Because of this the sheet can be extruded at unexpected speeds without rippling or other objectionable surface defects, whereas if the long approach to the extrusion slit of the prior art were employed, so much friction would be created as the plastic flowed down to the aperture and the pressure on the plastic along the line parallel to the aperture at the point of minimum caliper would be so uneven that a sheet having a surface and uniformity of caliper satisfactory for the delicate requirements of an inter-layer sheet for safety glass could not be produced at all at a speed that could be economically justified.

In order to illustrate the use of the apparatus of the present invention, the following specific examples are given wherein an apparatus was employed having movable blades or jaws providing extrusion passage in which the portion of minimum caliper was 1/16" in length.

*Example 1.*—A pyroxylin having a viscosity of 746 cps. was used. The viscosity was determined by the method previously referred to. For the plastic was used pyroxylin 10.7 kilograms, camphor 3.6 kilograms, mono-methyl-ether of ethylene glycol .940 kilogram, and 92% ethyl alcohol 14.1 kilograms; i. e. (percentages by weight) pyroxylin 36.4, camphor 12.3, mono-methyl-ether of ethylene glycol 3.2, and ethyl alcohol 48.1. These ingredients were mixed together in a closed mixer at 30° C. until a homogeneous mass was obtained. The mass was then filtered through a fine cloth at a pressure of 3000 pounds per square inch and a temperature of 75° C., into a closed container. From this container it was allowed to flow into a hydraulic press which forced it out horizontally at a pressure of 50 pounds per square inch and at a temperature of 54° C. through an adjustable orifice into a hardening bath at 9° C. containing 70% by weight of glycerine. The jaws of the orifice were set 0.034" apart. The extruded sheet was pulled away from the orifice under tension of 4 pounds per square inch through 6 feet of the bath. The sheets then passed to another like bath where the tension was increased to 10 pounds per square inch and was allowed to remain in this bath for 2½ hours. After that the stock was placed in a chamber through which air at 40° was circulated for 3 days. The rate of extrusion, and travel through the first bath was 10 feet linear per minute. The temperature of the second bath was 18° C. The sheet was of exceptional smoothness, and practically without variations in caliper. The final caliper of the sheet was 0.020 inch after seasoning.

*Example 2.*—Pyroxylin of a viscosity of 746 cps. determined as above, was used. For the plastic was used pyroxylin 10.7 kilograms, camphor 3.6 kilograms, ethyl alcohol 5 kilograms, C. P. acetone 7.2 kilograms; i. e. percentages by weight, pyroxylin 40.4, camphor 13.6, ethyl alcohol 18.9, acetone 27.1. These ingredients were mixed together in a closed mixer at 30° C. until a homogeneous mass was obtained. The mass was then filtered through a fine cloth under a pressure of 2000 pounds per square inch at a temperature of 72° C. into a closed container. From the container it was allowed to flow into a hydraulic press which forced it out at a pressure of 47 pounds per square inch and at a temperature of 49° C. through an adjustable orifice into a hardening bath of saturated water solution of sodium chloride at 12° C. The opening of the orifice was set at 0.016". The tension on the emerging sheet was 4 pounds per square inch. The sheet traveled through 6 feet of the hardening bath and was then washed and placed in a chamber of air at 40° C. under a tension of 12 pounds per square inch for 6 days. The rate of extrusion, and travel through the bath, was 8 ft. linear per minute. The sheet was of exceptional smoothness, and practically without variation in caliper. The final caliper of the sheet was 0.010" after seasoning.

Example 3.—There was used a cellulose acetate plastic containing cellulose acetate 11.9 kilograms, triphenyl phosphate 2.0 kilograms, dimethyl phthalate 1.5 kilograms, ethyl acetate .7 kilogram and C. P. acetone 16 kilograms; i. e. percentages by weight, cellulose acetate 36.6, triphenyl phosphate 6.3, dimethyl phthalate 4.7, ethyl acetate 2.2, acetone 49.2. The ingredients were mixed in a closed mixer at 45° C. until a homogeneous mass was obtained. The compound was then filtered through a fine cloth at 1000 pounds pressure at 85° C. into a chamber through which a current of air of 60° C. was being passed. This process reduced the acetone content to 8.4 kilograms, or 34.3%, which yielded stock of the proper consistency for forming the sheet. The stock was then placed in a stuffing press and forced out through the orifice at 48 pounds per square inch at a temperature of 52° C. into a bath of a saturated water solution of sodium chloride at 11° C. The opening of the orifice was adjusted to 0.023". The tension on the emerging sheet was 4 pounds per square inch and the sheet was passed through 6 feet of the bath. It was then passed into a second like bath at 15° C. where the tension was increased to 10 pounds per square inch and the stock remained under tension in this bath for 2 hours. It was then removed and placed in a chamber, of hot circulating air for 2 days. The rate of extrusion, and travel through the first bath, was 14 linear feet per minute. The sheet was of exceptional smoothness and practically without variation in caliper. The final caliper of the sheet was 0.015" after seasoning.

Example 4.—There was used a benzyl cellulose plastic containing benzyl cellulose 10 kilograms, triphenyl phosphate 3 kilograms, ethyl acetate 1 kilogram and C. P. acetone 2 kilograms; i. e. percentages by weight, benzyl cellulose 62.5, triphenyl phosphate 18.75, ethyl acetate 6.25, acetone 12.5. The ingredients were mixed in a closed mixer at 50° C. until a homogeneous mass was obtained.

The mass was filtered through a coarse cloth under pressure of 5000 pounds at 20° C. into a closed container. The filtered material was then placed in a hydraulic press and forced out the orifice at a pressure of 45 pounds per square inch and a temperature of 45° C. into a hardening bath of saturated water solution of sodium chloride salt at 15° C. The opening of the orifice was set at 0.022". The emerging sheet was pulled away from the orifice under a tension of 3 pounds per square inch through 6 feet of the hardening bath. The stock was washed free of hardening solution and placed in a seasoning vault of air at 35° C. for 7 days. The rate of extrusion, and travel through the bath, was 11 linear feet per minute. The sheet was of exceptional smoothness, and practically without variation in caliper. The final caliper of the stock was 0.018" after seasoning.

Example 1 was performed with an orifice 3.5 inches in width, and repeated with an orifice 11.5 inches in width. Examples 2, 3 and 4 were performed with an orifice 3.5 inches in width.

The sheeting produced by this process can be made with a smooth almost glassy surface which press polishes perfectly and may be readily laminated between glass plates for the production of non-shatterable glass. It does not contain the objectionable sheeter lines common to sheets made by the block process. Rough sheeting such as that used in making phonograph records by diepressing may be produced at approximately double the rate of smooth surfaced sheeting. The higher speed of production simply tends to roughen the surface and produce a sheet of more uneven caliper, which is, however, good enough for diepress work. The process can be used for the production of sheets of any desired width. Thus an orifice varying in length from 3 inches or less to 5 feet or more may be used, producing sheets of corresponding width.

It is to be understood that the above examples are merely illustrative and that the apparatus of the present invention is broadly applicable for extrusion of plastics regardless of specific compositions. While the apparatus has been described with particular reference to the production of a continuous web of material, it is likewise adaptable for the production of thin walled tubing or any thin walled body that may be continuously extruded. Obviously, where making a thin walled tube, or the like, concentric blades would be employed but the principle of this invention is still applicable, namely, that the portion of the extrusion passage of minimum caliper shall not exceed ¼" in length and that the approach to the portion of minimum caliper shall be so wide as to give the plastic unrestricted flow right up to that point.

As many apparently widely different embodiments of this invention may be made without departing from the spirit and scope thereof, it is to be understood that the invention is not limited to the specific embodiments thereof except as defined in the appended claims.

We claim:

1. An apparatus for extruding a continuous web of cellulosic derivative plastic, or similar plastic, of a finished thickness of 0.003" to 0.035" at a speed of at least 4 feet a minute, the pressure on the plastic mass being extruded ranging from 30 to 400 pounds per square inch and the consistency of the plastic mass being between that possessed by a plastic composed of 24% pyroxylin of 800 centipoises, 8% camphor, and 68% ethyl alcohol and that of a plastic composed of 46% pyroxylin of 800 centipoises, 16% camphor, and 38% ethyl alcohol at 52° C., which apparatus comprises a container for the plastic, said container being provided with a slit-like aperture through which the plastic is extruded, a means for exerting a uniform pressure of 30–400 pounds per square inch on the plastic mass in the container adjacent the aperture, said aperture at the portion of minimum caliper being defined by a pair of opposed edges substantially straight and parallel for at least the greater part of their length and separated by 0.004" to 0.050" and said aperture being so designed that the path of travel of the plastic through the portion of the aperture of minimum caliper shall not exceed ¼" in length and said aperture being further so designed as to give the plastic mass such unrestricted flow up to the initial point of minimum caliper of the aperture that the pressure on the plastic mass immediately preceding said initial point is uniform along the line parallel to said pair of opposed edges.

2. An apparatus for extruding a continuous web of cellulosic derivative plastic, or similar plastic, of a finished thickness of 0.003" to 0.035" at a speed of at least 4 feet a minute, the pressure on the plastic mass being extruded ranging from 30 to 400 pounds per square inch and the consistency of the plastic mass being between that possessed by a plastic composed of 24% pyroxylin of 800 centipoises, 8% camphor, and 68% ethyl alcohol and that of a plastic composed at 36% pyroxylin of 800 centipoises, 16% camphor, and 38% ethyl alcohol at 52° C., which apparatus comprises a container for the plastic, said container being provided with a slit-like aperture through which the plastic is extruded in web form, means for exerting a uniform pressure of 30–400 pounds per square inch on the plastic mass in the container adjacent the aperture, and a pair of blades carried in opposed position by said container adjacent said aperture to define the minimum caliper portion of the passage through which the plastic is extruded, the edges of said blades being substantially straight and parallel for at least the greater part of their length and separated by 0.004" to 0.050" and said blades being so designed that the path of travel of the plastic through the minimum caliper portion of the passage shall not exceed ¼" in length, and said aperture in the container and said blades both being so designed as to give the plastic mass such unrestricted flow up to the initial point of the minimum caliper portion of the passage that the pressure on the mass immediately preceding said initial point is uniform along the line parallel to said pair of opposed blades.

3. An apparatus as recited in claim 1 wherein the aperture is so designed that the path of travel of the plastic through the portion of the aperture of minimum caliper shall be approximately $\tfrac{1}{16}$" in length.

4. An apparatus as recited in claim 2 wherein the blades are so designed that the path of travel of the plastic through the minimum caliper portion of the passage shall be approximately $\tfrac{1}{16}$" in length.

PAUL W. CRANE.
REUBEN T. FIELDS.